United States Patent
Parsons et al.

(10) Patent No.: US 6,416,875 B1
(45) Date of Patent: Jul. 9, 2002

(54) MULTI-COMPONENT ARTICLES PREPARED FROM HYDROGENATED BLOCK COPOLYMERS

(75) Inventors: Gary D. Parsons, Midland; James P. Maher, Freeland, both of MI (US)

(73) Assignee: Dow Global Technologies Inc., Midland, MI (US)

( * ) Notice: Subject to any disclaimer, the term of this patent is extended or adjusted under 35 U.S.C. 154(b) by 58 days.

(21) Appl. No.: 09/717,865

(22) Filed: Nov. 21, 2000

Related U.S. Application Data

(60) Provisional application No. 60/170,892, filed on Dec. 15, 1999.

(51) Int. Cl.$^7$ .............................................. B32B 27/32
(52) U.S. Cl. .................... 428/517; 362/488; 362/489; 428/516; 525/98; 525/332.9; 525/338; 525/339; D12/192
(58) Field of Search .................................. 428/516, 517; 525/98, 332.9, 338, 339; D12/192; 362/488, 489

(56) References Cited

U.S. PATENT DOCUMENTS

| | | | |
|---|---|---|---|
| 3,670,054 A | | 6/1972 | De La Mare |
| 6,005,050 A | * | 12/1999 | Okada et al. .................. 525/68 |

FOREIGN PATENT DOCUMENTS

| | | |
|---|---|---|
| EP | 505 110 | 9/1992 |
| EP | 697 435 | 2/1996 |
| EP | 733 677 | 9/1996 |
| GB | 2 178 433 | 2/1987 |
| GB | 2 225 330 | 5/1990 |
| JP | 63-115739 | 5/1988 |
| JP | 63-115740 | 5/1988 |
| JP | 63-115741 | 5/1988 |
| JP | 63-306014 | 12/1988 |
| JP | 62-142196 | 1/1992 |
| JP | 63-183844 | 7/1992 |

OTHER PUBLICATIONS

Macromolecules, "Heterogenous catalytic hydrogenation of poly(styrene): Thermodynamics of poly (vinyllcyclohexane) containing diblock copolymers.", vol. 26, No. 16, pp. 4122–4127, M. D. Gehlsen, Aug. 2, 1993.

* cited by examiner

Primary Examiner—D. S. Nakarani

(57) ABSTRACT

The present invention is directed to a multi-component article which comprises at least two components, each component being produced from a different polymer composition, and at least one polymer composition comprises a hydrogenated block copolymer comprising at least two distinct blocks of hydrogenated vinyl aromatic polymer, and at least one block of hydrogenated conjugated diene polymer, characterized by:

a hydrogenation level such that each hydrogenated vinyl aromatic polymer block has a hydrogenation level of greater than 90 percent and the hydrogenated conjugated diene polymer block has a hydrogenation level of greater than 95 percent, with the proviso that when more than one component is prepared from compositions comprising hydrogenated block copolymers, each composition differs compositionally such that the vinyl aromatic polymer block content of the compositions differs by at least 20 percent.

26 Claims, No Drawings

MULTI-COMPONENT ARTICLES PREPARED FROM HYDROGENATED BLOCK COPOLYMERS

CROSS REFERENCE STATEMENT

This application claims the benefit of U.S. Provisional Application No. 60/170,892, filed Dec. 15, 1999.

BACKGROUND OF THE INVENTION

This invention relates to multi-component articles prepared from highly hydrogenated block copolymers. Specifically, it refers to articles produced from hydrogenated vinyl aromatic and conjugated diene block copolymers.

Multi-component articles, are articles having more than one 'part' or 'component', such as articles containing both a rigid and an elastomeric component, e.g. an article comprising a transparent rigid lens and an elastomeric weather seal. Such articles are typically produced by individually producing each component separately, prior to assembly of the multi-component article. The components are typically made of different polymer compositions which are incompatible with each other in the molten phase. Therefore, recycle is not possible without first separating the different polymer components.

Multi-component articles have been produced from hydrogenated block copolymers and polyolefins as described in JP Kokoku 4-4130 by Asahi Kasei Corp. However, the hydrogenated block copolymer has very low aromatic hydrogenation and is modified with an additional functional group which would hinder compatibility of the polymer with the polyolefin for recycling purposes without component separation. For the purposes of this application, recycling refers to the reuse of a polymer material or combination of polymer materials such that the entire material can be reused as a sole component within an identical application without significant loss of polymer properties.

Therefore, there remains a need for multi-component articles in which the components can be recycled without costly separation processes.

SUMMARY OF THE INVENTION

The present invention is directed to a multi-component article which comprises at least two components, each component being produced from a different polymer composition, and at least one polymer composition comprises a hydrogenated block copolymer comprising at least two distinct blocks of hydrogenated vinyl aromatic polymer, and at least one block of hydrogenated conjugated diene polymer, characterized by:
a hydrogenation level such that each hydrogenated vinyl aromatic polymer block has a hydrogenation level of greater than 90 percent and the hydrogenated conjugated diene polymer block has a hydrogenation level of greater than 95 percent,
with the proviso that when more than one component is prepared from compositions comprising hydrogenated block copolymers, each composition differs compositionally such that the vinyl aromatic polymer block content of the compositions differs by at least 20 percent.

In another aspect, the present invention is directed to the multi-component article as described above, in which the components are adhered to one another without the use of adhesives.

These multi-component articles are fully recyclable, wherein the entire article can be reground without a component separation process to produce a polymer composition which has properties similar to those of the original materials, and can be reused as the sole material in the original applications.

DESCRIPTION OF THE PREFERRED EMBODIMENTS

The present invention relates to a multi-component article which comprises at least two components produced from different polymer compositions. In one preferred embodiment the invention allows for the advantageous manufacture of an article having an elastomeric component and a rigid component which enables complete article recycling without a separation process.

At least one of the polymer compositions comprises a hydrogenated block copolymer derived from at least one vinyl aromatic monomer and at least one conjugated diene monomer.

The vinyl aromatic monomer is typically a monomer of the formula:

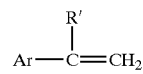

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, hydroxy, cyano, carbonyl and carboxyl. More preferably Ar is phenyl or alkyl phenyl with phenyl being most preferred. Typical vinyl aromatic monomers include styrene, alpha-methylstyrene, all isomers of vinyl toluene, especially paravinyltoluene, all isomers of ethyl styrene, propyl styrene, butyl styrene, vinyl biphenyl, vinyl naphthalene, vinyl anthracene and the like, and mixtures thereof. The pentablock copolymer can contain more than one specific polymerized vinyl aromatic monomer. In other words, for example, the pentablock copolymer can contain a polystyrene block and a poly-alpha-methylstyrene block. The hydrogenated vinyl aromatic polymer block may also be a copolymer of a vinyl aromatic wherein the vinyl aromatic portion is at least 50 weight percent of the copolymer.

The conjugated diene monomer can be any monomer having two conjugated double bonds. Such monomers include for example 1,3-butadiene, 2-methyl-1,3-butadiene, 2-methyl-1,3 pentadiene, isoprene and similar compounds, and mixtures thereof.

The conjugated diene polymer block can be prepared from materials which remain amorphous after the hydrogenation process, or materials which are capable of crystallization after hydrogenation. Hydrogenated polyisoprene blocks remain amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provides substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. Depending on the final application of the polymer it may be desirable to incorporate a crystalline block (to improve solvent resistance) or an amorphous, more compliant block. In some applications, the block copolymer can contain more than one conjugated diene polymer block, such as a polybutadiene block and a polyisoprene block. The conjugated diene polymer block may also be a copolymer of a conjugated diene, wherein the conjugated diene portion of the copolymer is at least 50 weight percent of the copolymer, based on the total weight of the copolymer.

Other polymeric blocks may also be included in the hydrogenated block copolymers used in the present invention.

Preferably, the hydrogenated block copolymer is a non-functionalized block copolymer. The term 'non-functionalized' refers to the absence of any functional groups, i.e. groups containing elements other than carbon and hydrogen, within the block copolymer.

In one preferred embodiment, the hydrogenated block copolymer is a hydrogenated triblock or pentablock copolymer of styrene and butadiene, which does not contain any other functional groups or structural modifiers for increased adhesion.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. Microphase separation and block copolymers are widely discussed in "Block Copolymers-Designer Soft Materials", PHYSICS TODAY, February, 1999, pages 32–38.

The hydrogenated block copolymers typically contain from 1 to 99 weight percent of a hydrogenated vinyl aromatic polymer, e.g. polyvinylcyclohexane or PVCH block, generally from 10, preferably from 15, more preferably from 20, even more preferably from 25, and most preferably from 30 to 90 weight percent, preferably to 85 and most preferably to 80 percent, based on the total weight of the hydrogenated block copolymer.

The hydrogenated block copolymers typically contain from 1 to 99 weight percent of a hydrogenated conjugated diene polymer block, preferably from 10, more preferably from 15, and most preferably from 20 to 90 weight percent, typically to 85, preferably to 80, more preferably to 75, even more preferably to 70 and most preferably to 65 percent, based on the total weight of the copolymer.

One advantage of hydrogenated block copolymers is the ability to produce polymers ranging from elastomeric to rigid polymers.

Flexible or elastomeric hydrogenated block copolymers typically have a weight ratio of hydrogenated conjugated diene polymer block to hydrogenated vinyl aromatic polymer block of from 40:60 to 95:5, preferably from 45:55 to 90:10, more preferably from 50:50 to 85:15 and most preferably from 60:40 to 80:20, based on the total weight of the hydrogenated conjugated diene and hydrogenated vinyl aromatic polymer blocks. The total weights of the hydrogenated vinyl aromatic polymer blocks and the hydrogenated conjugated diene polymer block(s) is typically at least 80 weight percent, preferably at least 90, and more preferably at least 95 weight percent of the total weight of the hydrogenated copolymer.

Rigid hydrogenated block copolymers typically have a weight ratio of hydrogenated conjugated diene polymer block to hydrogenated vinyl aromatic polymer block of from 40:60 to 5:95, preferably from 35:65 to 10:90, more preferably from 30:70 to 15:85, based on the total weight of the hydrogenated conjugated diene polymer block and the hydrogenated vinyl aromatic polymer block. The total weights of the hydrogenated vinyl aromatic polymer blocks and the hydrogenated conjugated diene polymer block(s) is typically at least 80 weight percent, preferably at least 90, and more preferably at least 95 weight percent of the total weight of the hydrogenated copolymer.

Hydrogenated block copolymers are produced by the hydrogenation of block copolymers including triblock, multiblock, tapered block, and star block copolymers such as SBS, SBSBS, SIS, SISIS, SISBS and the like (wherein S is polystyrene, B is polybutadiene and I is polyisoprene). The block copolymers contain at least one triblock segment comprised of a vinyl aromatic polymer block on each end. The block copolymers may, however, contain any number of additional blocks, wherein these blocks may be attached at any point to the triblock polymer backbone. Thus, linear blocks would include for example SBS, SBSB, SBSBS, SBSBSB, and the like. The copolymer can also be branched, wherein polymer chains are attached at any point along the copolymer backbone.

The total number average molecular weight ($Mn_t$) of the hydrogenated block copolymers is typically from 30,000, preferably from 40,000, more preferably from 45,000 and most preferably from 50,000 to 120,000, typically to 100,000, generally to 95,000, preferably to 90,000, more preferably to 85,000, and most preferably to 80,000. Number average molecular weight (Mn) as referred to throughout this application is determined using gel permeation chromatography (GPC). The molecular weight of the hydrogenated block copolymer and properties obtained are dependent upon the molecular weight of each of the hydrogenated polymeric blocks. It has been discovered that by optimizing the molecular weight of the hydrogenated polymeric blocks, hydrogenated block copolymers of low molecular weight (30,000 to 120,000) can achieve high heat distortion temperatures, excellent toughness and tensile strength properties and are highly transparent with good surface appearance. Surprisingly, we have found that good physical properties can be obtained at relatively low hydrogenated block copolymer molecular weights which gives superior processability.

Typical number average molecular weight values ($Mn_a$) for each hydrogenated vinyl aromatic polymer block are from 5,000, preferably from 10,000, more preferably from 13,000 and most preferably from 15,000 to 50,000, preferably to 45,000, more preferably to 40,000 and most preferably to 35,000. It should be noted that good properties are obtained at hydrogenated vinyl aromatic polymer molecular weights which are lower than the entanglement molecular weight of the hydrogenated vinyl aromatic polymer. The entanglement molecular weight of a polymer is associated with the chain length required for a given polymer to show a dramatic increase in melt viscosity due to chain entanglements. The entanglement molecular weights for many common polymers have been measured and reported in Macromolecules, 1994, Volume 27, page 4639. It is commonly observed for glassy polymers that maximum values of strength and toughness are achieved at about 10 times the entanglement molecular weight (see for instance Styrene Polymers in the Encyclopedia of Polymer Science and Engineering, 2nd edition, Volume 16, pages 62–71, 1989). The entanglement molecular weight is approximately 38,000 for polyvinylcyclohexane. We have determined that an optimum balance of properties and processability can be obtained at hydrogenated vinyl aromatic polymer block molecular weights ($Mn_a$) of 0.2 to 1.2 times the entanglement molecular weight of a hydrogenated vinyl aromatic polymer. In general, the optimum $Mn_a$ for a hydrogenated polystyrene block in the hydrogenated block copolymer of the present invention is from 7,000 to 45,000.

The molecular weight ($Mn_b$) of each hydrogenated conjugated diene polymer block is typically lower than that of the hydrogenated vinyl aromatic polymer block when a high modulus, rigid polymer is desired. The $Mn_b$ of the hydrogenated diene polymer block is typically from 4,000, preferably from 5,000, more preferably from 8,000 and most preferably from 10,000 to 110,000, preferably to 90,000, more preferably to 55,000 and most preferably to 30,000.

The Mn of the hydrogenated blocks will also depend upon the properties desired in the hydrogenated block copolymer produced. If rigid hydrogenated block copolymers are desired, the Mna of the hydrogenated vinyl aromatic polymer block will typically be from 10,000, preferably from 12,000, more preferably from 15,000 and most preferably from 20,000 to 50,000, preferably to 45,000, more preferably to 43,000 and most preferably to 40,000; while the $Mn_b$ of the hydrogenated diene polymer block will typically be from 4,000, preferably from 8,000, more preferably from 10,000, and most preferably from 12,000 to 30,000, preferably to 28,000, most preferably to 25,000 and most preferably to 22,000. If elastomeric hydrogenated block copolymers are desired, the $Mn_a$ of the hydrogenated vinyl aromatic polymer block will typically be from 5,000, preferably from 5,500, more preferably from 6,000, and most preferably from 7,000 to 20,000, preferably to 18,000, more preferably to 16,500 and most preferably to 15,000; while the $Mn_b$ of the hydrogenated diene polymer block will typically be from 35,000, preferably from 38,000, more preferably from 40,000 and most preferably from 45,000 to 110,000, preferably to 100,000, more preferably to 90,000 and most preferably to 80,000. Flexible type hydrogenated block copolymers, which would not be considered elastomeric, can be achieved by using Mn's somewhere in between the rigid and elastomeric values.

It is important to note that each individual block of the hydrogenated block copolymer of the present invention, can have its own distinct Mn. In other words, for example, two hydrogenated vinyl aromatic polymer blocks within the hydrogenated block copolymer may each have a different Mn.

Methods of making block copolymers are well known in the art. Typically, block copolymers are made by anionic polymerization, examples of which are cited in *Anionic Polymerization: Principles and Practical Applications*, H. L. Hsieh and R. P. Quirk, Marcel Dekker, N.Y., 1996. In one embodiment, block copolymers are made by sequential monomer addition to a carbanionic initiator such as sec-butyl lithium or n-butyl lithium. In another embodiment, the copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. Nos. 4,200,718 and 4,196,154 which are herein incorporated by reference.

After preparation of the block copolymer, the copolymer is hydrogenated to remove sites of unsaturation in both the conjugated diene polymer block and the vinyl aromatic polymer block segments of the copolymer. Any method of hydrogenation can be used and such methods typically include the use of metal catalysts supported on an inorganic substrate, such as Pd on $BaSO_4$ (U.S. Pat. No. 5,352,744) and Ni on kieselguhr (U.S. Pat. No. 3,333,024) both of which are incorporated herein by reference. Additionally, soluble, homogeneous catalysts such those prepared from combinations of transition metal salts of 2-ethylhexanoic acid and alkyl lithiums can be used to fully saturate block copolymers, as described in *Die Makromolekulare Chemie*, Volume 160, pp. 291, 1972. The copolymer hydrogenation can also be achieved using hydrogen and a heterogeneous catalyst such as those described in U.S. Pat. Nos. 5,352,744, 5,612422 and 5,645,253, which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ and which is synthesized such that is contains pores with diameters ranging between 3000 and 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof. Other heterogeneous catalysts can also be used, having diameters in the range of 500 to 3,000 angstroms.

The level of hydrogenation of the block copolymer of the present invention is preferably greater than 95 percent of the conjugated diene polymer block and greater than 90 percent of the vinyl aromatic polymer block segments, more preferably greater than 99 percent of the conjugated diene polymer block and greater than 95 percent of the vinyl aromatic polymer block segments, even more preferably greater than 99.5 percent of the conjugated diene polymer block and greater than 98 percent of the vinyl aromatic polymer block segments, and most preferably greater than 99.9 percent of the conjugated diene polymer block and 99.5 percent of the vinyl aromatic polymer block segments. Such high levels of hydrogenation are preferred in order to achieve good adhesion to polyolefins. The term 'level of hydrogenation' refers to the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

A second component of the multi-component article of the present invention is a component prepared from a composition comprising a different polymer than the hydrogenated block copolymer of the first component. This means that the second component can be prepared from an essentially saturated hydrocarbon polymer or from a different hydrogenated block copolymer. The term 'essentially saturated' refers to a polymer having less than 10 percent unsaturation.

For example, the second component can be prepared from a composition comprising a polyolefin polymer or from a composition comprising a hydrogenated block copolymer having a different vinyl aromatic/conjugated diene ratio than the hydrogenated block copolymer of the first component, e.g. a first component of an elastomeric hydrogenated block copolymer and a second component of a rigid hydrogenated block copolymer. If more than one component is prepared from a composition comprising a hydrogenated block copolymer, then the hydrogenated block copolymer differs sufficiently in composition such that the vinyl aromatic polymer block content of the copolymers differs by at least 20 percent, preferably at least 25 percent, and most preferably at least 30 percent.

Examples of polymers which can be used as the second component include homopolymers and copolymers of olefinic monomers such as ethylene, propylene, butylene and the like. Other examples of polyolefins include high density polyethylene, low density polyethylene, linear low destiny polyethylenes, modified polyethylenes, polypropylene, copolymers of polypropylene with ethylene or butene, modified polypropylenes and the like. The polyolefin can be any rigid, flexible or elastomeric polyolefin as is known in the art. Elastomeric polyolefins include any polymer comprising one or more $C_{2-20}$ α-olefins in polymerized form, having Tg less than 25° C., preferably less than 0° C. Examples of the types of polymers from which the present elastomeric polyolefins are selected include homopolymers and copolymers of α-olefins, such as ethylene/propylene, ethylene/1-butene, ethylene/1-hexene or ethylene/1-octene copolymers, and terpolymers of ethylene, propylene and a comonomer such as hexadiene or ethylidenenorbornene.

Cyclic olefin polymers or copolymers can also be used as a second component and include polymerized or copolymerized cycloolefin monomers such as the norbornene-type polymers described in U.S. Pat. Nos. 5,115,041, 5,142,007, 5,143,979, all of which are incorporated herein by reference. The cycloolefin moiety may be substituted or unsubstituted. Suitable cycloolefin monomers include substituted and unsubstituted norbornenes, dicyclopentadienes, dihydrodicyclopentadienes, trimers of cyclopentadiene, tetracyclododecenes, hexacycloheptadecenes, ethylidenyl norbornenes and vinylnorbornenes. Substituents on the cycloolefin monomers include hydrogen, alkyl alkenyl, and aryl groups of 1 to 20 carbon atoms and saturated and unsaturated cyclic groups of 3 to 12 carbon atoms which can be formed with one or more, preferably two, ring carbon atoms. Generally speaking, the substituents on the cycloolefin monomers can be any which do not poison or deactivate the polymerization catalyst. Examples of preferred monomers include but are not limited to dicyclopentadiene, methyltetracyclo-dodecene, 2-norbornene, and other norbornene monomers such as 5-methyl-2-norbornene, 5,6-dimethyl-2-norbornene, 5-ethyl-2-norbornene, 5-ethylidenyl-2-norbornene, 5-butyl-2-norbornene, 5-hexyl-2-norbornene, 5-octyl-2-norbornene, 5-phenyl-2-norbornene, 5-dodecyl-2-norbornene, 5-isobutyl-2-norbornene, 5-octadecyl-2-norbornene, 5-isopropyl-2-norbornene, 5-p-toluyl-2-norbornene, 5-α-naphthyl-2-norbornene, 5-cyclohexyl-2-norbornene, 5-isopropenyl-2-norbornene, 5-vinyl-2-norbornene, 5,5-dimethyl-2-norbornene, tricyclopentadiene (or cyclopentadiene trimer), tetracyclopentadiene (or cyclopentadiene tetramer), dihydrodicyclopentadiene (or cyclopentene-cyclopentadiene co-dimer), methyl-cyclopentadiene dimer, ethyl-cyclopentadiene dimer, tetracyclododecene 9-methyl-tetracyclo[6,2,1,13,6O2,7]dodecene-4, (or methyl-tetracyclododecene), 9-ethyl-tetracyclo[6,2,1,13,6O2,7] dodecene-4, (or ethyl-tetracyclododecene), 9-hexyl-tetracyclo-[6,2,1,13,6O2,7]dodecene-4, 9-decyl-tetracyclo [6,2,1,13,6O2,7]dodecene-4, 9-decyl-tetracyclo[6,2,1,13, 6O2,7]dodecene-4, 9,10-dimethyl-tetracyclo[6,2,1,13,6O2, 7]dodecene-4, 9-methyl-10-ethyl-tetracyclo[6,2,1,13,6O2, 7]dodecene-4, 9-cyclohexyl-tetracyclo [6,2,1,13,6O2,7] dodecene-4, 9-chloro-tetracyclo[6,2,1,13,6O2,7]dodecene-4, 9-bromo-tetracyclo[6,2,1,13,6O2,7]dodecene-4, 9-fluoro-tetracyclo[6,2,1,13,6O2,7]dodecene-4, 9-isobutyl-tetracyclo [6,2,1,13,6O2,7]dodecene-4, and 9,10-dichlorotetracyclo[6, 2,1,13,6O2,7]-dodecene-4.

Polymers comprising two or more different types of monomeric units are also suitable. For example, copolymers of methyltetracyclododecane (MTD) and methylnorbornene (MNB) are especially suitable. More preferably, the polymers comprise three or more different types of monomeric units, e.g., terpolymers, including MTD, MNB and dicyclopentadiene (DCPD).

Ring opening metathesis polymers may also be used as a second component and include polymers prepared by metathesis ring opening (co)polymerization of a norbornene or tetracyclododecane, such as those described in JP-85/26,024 and U.S. Pat. No. 5,053,471 which is incorporated herein by reference.

Each component can also contain other materials typically used in the desired application. Other materials include but are not limited to colorants, pigments, process stabilizers, flow enhancers, glass fibers, fillers, light stabilizers, fillers, flame retardants and the like.

In addition to the recyclability of the multi-component articles of the present invention, it has been surprisingly discovered that the hydrogenated block copolymer component can have excellent adhesion to a polyolefin component, or other hydrogenated block copolymer component and can be used in producing multi-component articles wherein the block copolymer is directly adhered to a polyolefin or other hydrogenated block copolymer without the use of adhesives. In such applications, the components of the multi-component article may be situated in any arrangement such that at least the hydrogenated block copolymer component is adhered to a second component comprising a polyolefin or different hydrogenated block copolymer. The components can be in the form of layers, or can be adhered side by side in any fashion.

The components of the multi-component article can be rigid, flexible or elastomeric, or any combination thereof.

In one embodiment, one component is prepared from a composition comprising a rigid hydrogenated block copolymer and a second component is prepared from a composition comprising an elastomeric hydrogenated block copolymer and can be exemplified by a toothbrush wherein the handle is the rigid component and the bristles are elastomeric.

In another embodiment, one component is prepared from a composition comprising a rigid polyolefin and the other component is prepared from a composition comprising an elastomeric hydrogenated block copolymer and can be exemplified by an automotive instrument panel, soft covering on an automotive interior component such as a soft touch radio knob, or a wheel having a rigid interior rim and an outer elastomeric tire.

In another embodiment a rigid polyolefin and a rigid hydrogenated block copolymer are adhered within a multi-component article such as in an instrument cluster system for automotive applications wherein the back is talc filled polypropylene and the front is transparent hydrogenated block copolymer.

In yet another specific embodiment, the multi-component article is an automotive instrument panel wherein the skin is prepared from a composition comprising an elastomeric hydrogenated block copolymer, the instrument cluster lens is prepared from a rigid hydrogenated block copolymer, and the substrate is filled polypropylene.

Other examples of multi-component articles within the scope of the present invention include, automotive instrument, roof and door panels, automotive gaskets on rigid lenses for sealed lighting and instrument components, automotive seating, soft touch articles, laminated articles, composite foam panels, weather stripping on profiles, sports equipment such as shin guards, optical fibers and connectors, display lenses, electronic device outer covers and sealing gaskets. The multi-component articles of the present invention can be recycled as a unit, without the need to separate each component.

Multi-component articles can be produced in numerous ways which are all well known in the art. In embodiments wherein the components are adhered to one another, the parts are made such that the molten components are in contact with one another during the manufacturing process or wherein at least one component is in the molten phase. Such processes wherein two molten phases are used include co-injection molding, coextrusion, two shot molding, two shot blow molding, two component fiber melt spinning and the like. Processes in which 1 molten component is used include insert molding, extrusion lamination and in mold lamination, and extrusion coating. Methods of producing components for use in multi-component articles and one step processes for producing multi-component articles are described in *Plastics Engineering Handbook of the Society of the Plastics Industry,* Inc., Fourth Edition, 1976; *Injection Molding Handbook* by Rosato and Rosato, 1986, and in U.S. Pat. Nos. 4,340,563; 4,663,220; 4,668,566; 4,322,027; and 4,413,1 10, incorporated herein by reference.

What is claimed is:

1. A multi-component article which comprises at least two components, each component being produced from a different polymer composition, wherein at least one polymer composition comprises a hydrogenated block copolymer prepared by a process consisting essentially of hydrogenating a block copolymer produced from at least one vinyl aromatic monomer and at least one conjugated diene monomer, wherein the copolymer is characterized by at least two distinct blocks of hydrogenated vinyl aromatic polymer, and at least one block of hydrogenated conjugated diene polymer, further characterized by a hydrogenation level such that each hydrogenated vinyl aromatic polymer block has a hydrogenation level of greater than 90 percent and the hydrogenated conjugated diene polymer block has a hydrogenation level of greater than 95 percent.

2. The multi-component article of claim 1, wherein the hydrogenated vinyl aromatic polymer block comprises hydrogenated polystyrene.

3. The multi-component article of claim 1, wherein the hydrogenated conjugated diene polymer block comprises hydrogenated polybutadiene.

4. The multi-component article of claim 1, wherein the hydrogenated conjugated diene polymer comprises hydrogenated polyisoprene.

5. The multi-component article of claim 1, wherein the hydrogenated block copolymer is non-functionalized.

6. The multi-component article of claim 1, wherein the hydrogenated block copolymer comprises from 10 to 90 weight percent hydrogenated vinyl aromatic polymer, based on the total weight of the hydrogenated block copolymer.

7. The multi-component article of claim 1, wherein the hydrogenated block copolymer comprises from 10 to 90 weight percent hydrogenated conjugated diene polymer, based on the total weight of the hydrogenated block copolymer.

8. The multi-component article of claim 1 which additionally comprises a component produced from a polymer composition wherein the polymer composition comprises a homopolymer or copolymer of an olefinic monomer, a cyclic olefin polymer or copolymer, or a ring opening metathesis polymer.

9. The multi-component article of claim 8 wherein the polymer composition comprises a homopolymer or copolymer of ethylene, propylene, or butylene; high density polyethylene, low density polyethylene, or linear low density polyethylene.

10. The multi-component article of claim 1 wherein one component is prepared from a composition comprising a rigid hydrogenated block copolymer and a second component is prepared from a composition comprising an elastomeric hydrogenated block copolymer.

11. The multi-component article of claim 1 wherein one component is prepared from a composition comprising a rigid polyolefin and a second component is prepared from a composition comprising an elastomeric hydrogenated block copolymer.

12. The multi-component article of claim 1 wherein one component comprises a rigid polyolefin and a second component comprises a rigid hydrogenated block copolymer.

13. The multi-component article of claim 1 which is an automotive instrument panel having a skin prepared from a composition comprising an elastomeric hydrogenated block copolymer, an instrument cluster lens prepared from a rigid hydrogenated block copolymer, and a substrate of filled polypropylene.

14. A multi-component article which comprises at least two components, each component being produced from a different polymer composition, wherein at least one polymer composition comprises a hydrogenated block copolymer prepared by a process consisting essentially of hydrogenating a block copolymer produced from at least one vinyl aromatic monomer and at least one conjugated diene monomer, wherein the copolymer is characterized by at least two distinct blocks of hydrogenated vinyl aromatic polymer, and at least one block of hydrogenated conjugated diene polymer, further characterized by a hydrogenation level such that each hydrogenated vinyl aromatic polymer block has a hydrogenation level of greater than 90 percent and the hydrogenated conjugated diene polymer block has a hydrogenation level of greater than 95 percent, wherein the components are adhered to one another without the use of an adhesive.

15. The multi-component article of claim 14, wherein the hydrogenated vinyl aromatic polymer block comprises hydrogenated polystyrene.

16. The multi-component article of claim 14, wherein the hydrogenated conjugated diene polymer block comprises hydrogenated polybutadiene.

17. The multi-component article of claim 14, wherein the hydrogenated conjugated diene polymer comprises hydrogenated polyisoprene.

18. The multi-component article of claim 14, wherein the hydrogenated block copolymer is non-functionalized.

19. The multi-component article of claim 14, wherein the hydrogenated block copolymer comprises from 10 to 90 weight percent hydrogenated vinyl aromatic polymer, based on the total weight of the hydrogenated block copolymer.

20. The multi-component article of claim 14, wherein the hydrogenated block copolymer comprises from 10 to 90 weight percent hydrogenated conjugated diene polymer, based on the total weight of the hydrogenated block copolymer.

21. The multi-component article of claim 14 which additionally comprises a component produced from a polymer composition wherein the polymer composition comprises a homopolymer or copolymer of an olefinic monomer, a cyclic olefin polymer or copolymer, or a ring opening metathesis polymer.

22. The multi-component article of claim 21 wherein the polymer composition comprises a homopolymer or copolymer of ethylene, propylene, or butylene; high density polyethylene, low density polyethylene, or linear low density polyethylene.

23. The multi-component article of claim 14 wherein one component is prepared from a composition comprising a rigid hydrogenated block copolymer and a second component is prepared from a composition comprising an elastomeric hydrogenated block copolymer.

24. The multi-component article of claim 14 wherein one component is prepared from a composition comprising a rigid polyolefin and a second component is prepared from a composition comprising an elastomeric hydrogenated block copolymer.

25. The multi-component article of claim 14 wherein one component comprises a rigid polyolefin and a second component comprises a rigid hydrogenated block copolymer.

26. The multi-component article of claim 14 which is an automotive instrument panel having a skin prepared from a composition comprising an elastomeric hydrogenated block copolymer, an instrument cluster lens prepared from a rigid hydrogenated block copolymer, and a substrate of filled polypropylene.

\* \* \* \* \*